US012307370B2

(12) United States Patent
Robinson et al.

(10) Patent No.: US 12,307,370 B2
(45) Date of Patent: *May 20, 2025

(54) NEURAL NETWORK DATA COMPUTATION USING MIXED-PRECISION

(71) Applicant: MIPS Tech, LLC, San Jose, CA (US)

(72) Inventors: James Hippisley Robinson, New York, NY (US); Sanjay Patel, San Ramon, CA (US)

(73) Assignee: MIPS Tech, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/650,612

(22) Filed: Apr. 30, 2024

(65) Prior Publication Data

US 2024/0370743 A1    Nov. 7, 2024

Related U.S. Application Data

(63) Continuation of application No. 18/114,044, filed on Feb. 24, 2023, now Pat. No. 12,001,953, which is a
(Continued)

(51) Int. Cl.
*G06N 3/08* (2023.01)
*G06F 7/544* (2006.01)
(Continued)

(52) U.S. Cl.
CPC ............. *G06N 3/08* (2013.01); *G06F 7/5443* (2013.01); *G06N 3/063* (2013.01); *G06N 5/022* (2013.01);
(Continued)

(58) Field of Classification Search
None
See application file for complete search history.

(56) References Cited

U.S. PATENT DOCUMENTS 5,218,564 A * 6/1993 Haines ................ G06F 9/3877
708/603
6,148,101 A * 11/2000 Tanaka ................ G06N 3/063
706/29
(Continued)

FOREIGN PATENT DOCUMENTS

WO   WO-2019002811 A1 *  1/2019 ............. G06F 17/16
WO   WO-2020234558 A1 * 11/2020 ............. G06F 17/16

OTHER PUBLICATIONS

Machine Translation of Japanese Patent Application JP 2021535393 A, filed Aug. 30, 2018. (Year: 2018).*

*Primary Examiner* — Steven G Snyder

(57) ABSTRACT

Techniques for mixed-precision data manipulation for neural network data computation are disclosed. A first left group comprising eight bytes of data and a first right group of eight bytes of data are obtained for computation using a processor. A second left group comprising eight bytes of data and a second right group of eight bytes of data are obtained. A sum of products is performed between the first left and right groups and the second left and right groups. The sum of products is performed on bytes of 8-bit integer data. A first result is based on a summation of eight values that are products of the first group's left eight bytes and the second group's left eight bytes. A second result is based on the summation of eight values that are products of the first group's left eight bytes and the second group's right eight bytes. Results are output.

19 Claims, 9 Drawing Sheets

Related U.S. Application Data continuation of application No. 16/985,307, filed on Aug. 5, 2020, now Pat. No. 11,615,307, which is a continuation-in-part of application No. 16/778,258, filed on Jan. 31, 2020, which is a continuation-in-part of application No. 16/704,263, filed on Dec. 5, 2019, now Pat. No. 11,893,470.

(60) Provisional application No. 62/883,155, filed on Aug. 6, 2019, provisional application No. 62/867,966, filed on Jun. 28, 2019, provisional application No. 62/800,431, filed on Feb. 2, 2019, provisional application No. 62/791,788, filed on Jan. 12, 2019, provisional application No. 62/776,032, filed on Dec. 6, 2018.

(51) Int. Cl.
*G06N 3/063* (2023.01)
*G06N 5/022* (2023.01)

(52) U.S. Cl.
CPC .............. *G06F 2207/3824* (2013.01); *G06F 2207/4824* (2013.01)

(56) References Cited

U.S. PATENT DOCUMENTS

| | | | | |
|---|---|---|---|---|
| 7,072,929 B2* | 7/2006 | Pechanek | ............ | G06F 9/30014 708/622 |
| 7,395,298 B2* | 7/2008 | Debes | ................ | G06F 9/30025 712/E9.034 |
| 7,430,578 B2* | 9/2008 | Debes | ................ | G06F 9/30109 712/E9.034 |
| 7,624,138 B2* | 11/2009 | Debes | ................ | G06F 9/30109 708/523 |
| 8,959,136 B1* | 2/2015 | Cheung | ................ | G06F 17/16 708/607 |
| 9,104,473 B2* | 8/2015 | Wegener | ................ | G06F 7/483 |
| 9,106,936 B2* | 8/2015 | Wegener | ............ | H04N 23/661 |
| 9,423,999 B1* | 8/2016 | Linzer | ................ | H04N 19/60 |
| 9,519,457 B2* | 12/2016 | Shibayama | ......... | G06F 7/49942 |
| 10,135,473 B2* | 11/2018 | Fuchs | ................ | H04B 1/0475 |
| 10,167,800 B1* | 1/2019 | Chung | ................ | G06N 3/044 |
| 11,256,504 B2* | 2/2022 | Madduri | ............ | G06F 9/30036 |
| 11,443,013 B2* | 9/2022 | Komuravelli | ......... | G06F 17/153 |
| 11,455,143 B2* | 9/2022 | Ulrich | ................ | G06F 7/5443 |
| 11,481,471 B2* | 10/2022 | Nair | .................... | G06F 9/30112 |
| 11,520,853 B2* | 12/2022 | Nair | .................... | G06F 17/153 |
| 11,537,865 B2* | 12/2022 | Nair | .................... | G06F 9/30036 |
| 2002/0169813 A1* | 11/2002 | Pechanek | ................ | G06F 17/16 708/622 |
| 2004/0073773 A1* | 4/2004 | Demjanenko | ....... | G06F 9/30036 712/7 |
| 2004/0117422 A1* | 6/2004 | Debes | ................ | G06F 9/3885 712/E9.034 |
| 2017/0054449 A1* | 2/2017 | Mani | ................ | G01S 7/352 |
| 2018/0157465 A1* | 6/2018 | Bittner | ................ | G06F 5/012 |
| 2018/0212632 A1* | 7/2018 | Fuchs | ................ | H04B 1/0483 |
| 2018/0322382 A1* | 11/2018 | Mellempudi | ......... | G06N 3/084 |
| 2018/0341486 A1* | 11/2018 | Fowers | ................ | G06F 9/3867 |
| 2019/0332355 A1* | 10/2019 | Tinker | ................ | G06F 7/49947 |
| 2021/0349690 A1* | 11/2021 | Ulrich | ................ | G06F 7/5443 |

* cited by examiner

*FIG. 4*

NEURAL NETWORK DATA COMPUTATION USING MIXED-PRECISION

RELATED APPLICATIONS

This application is a continuation of, and claims the benefit of, U.S. patent application Ser. No. 18/114,044, filed 24 Feb. 2023. U.S. patent application Ser. No. 18/114,044 is a continuation of, and claims the benefit of, U.S. patent application Ser. No. 16/985,307, filed Aug. 5, 2020. U.S. patent application Ser. No. 16/985,307 claims the benefit of U.S. provisional patent application "Neural Network Data Computation Using Mixed-Precision" Ser. No. 62/883,155, filed Aug. 6, 2019.

U.S. patent application Ser. No. 16/985,307 is also a continuation-in-part of U.S. patent application "Neural Network Processing Using Mixed-Precision Data Representation" Ser. No. 16/778,258, filed Jan. 31, 2020, which claims the benefit of U.S. provisional patent applications "Neural Network Processing Using Mixed-Precision Data Representation" Ser. No. 62/800,431, filed Feb. 2, 2019, "Mixed-Precision Data Computation for Neural Network Reduction Operands" Ser. No. 62/867,966, filed Jun. 28, 2019, and "Neural Network Data Computation Using Mixed-Precision" Ser. No. 62/883,155, filed Aug. 6, 2019.

The U.S. patent application "Neural Network Processing Using Mixed-Precision Data Representation" Ser. No. 16/778,258, filed Jan. 31, 2020 is also a continuation-in-part of U.S. patent application "Neural Network Processing Using Specialized Data Representation" Ser. No. 16/704,263, filed Dec. 5, 2019, which claims the benefit of U.S. provisional patent applications "Neural Network Processing Using Specialized Data Representation" Ser. No. 62/776,032, filed Dec. 6, 2018, "Address Manipulation Using Indices and Tags" Ser. No. 62/791,788, filed Jan. 12, 2019, "Neural Network Processing Using Mixed-Precision Data Representation" Ser. No. 62/800,431, filed Feb. 2, 2019, "Mixed-Precision Data Computation for Neural Network Reduction Operands" Ser. No. 62/867,966, filed Jun. 28, 2019, and "Neural Network Data Computation Using Mixed-Precision" Ser. No. 62/883,155, filed Aug. 6, 2019.

Each of the foregoing applications is hereby incorporated by reference in its entirety.

FIELD OF ART

This application relates generally to data manipulation and more particularly to neural network data computation using mixed-precision.

BACKGROUND

Devices including personal electronic devices, and user activities such as online shopping and web surfing, are used to harvest data. The collected data, which includes image data, audio data, and internet data, is harvested from the devices and device users. The rate of data collection is increasing at a remarkable rate. Other data is collected from Internet of Things (IoT) devices, and within smart homes, offices, schools, and public places. The collected data is aggregated into immense datasets, or, colloquially, "big data". The big data contents are collated and analyzed by academic researchers, commercial ventures, governments, and others, for business, health, law enforcement, research, surveillance, and other purposes. Conventional processors and processing techniques are incapable of analyzing the amassed data. Analysis has become intractable because the computational demands of the analysis overwhelm the capabilities of the processors and techniques. Other data handling requirements, including the capture, storage, maintenance, access, transmission, and visualization of the data, further complicate the intense data analysis. The overall data processing and handling requirements saturate the storage and transfer capabilities of the traditional systems. Computable and scalable approaches to data processing and handling are desperately needed. These approaches require hardware architectures and software techniques, algorithms, heuristics, and so on. Users and owners of the datasets are motivated, intellectually or financially, to analyze the dataset contents. Additional analysis computations and purposes include business analytics; disease detection, tracking, and control; crime detection and prevention; meteorology; and complex science and engineering simulations; among many others. Among the advanced data analysis techniques, predictive analytics are proving useful to the applications. Additional approaches include the application of machine learning (ML) and deep learning (DL) techniques in support of the data analysis.

Neural networks are among the most promising architectural candidates for the data handling and processing tasks. The neural networks can be based on reconfigurable processor hardware, field programmable gate arrays, application specific gate arrays, custom integrated circuits or chips, and other configurable and reconfigurable architectures. Reconfigurable computing architectures integrate desirable characteristics of both hardware and software techniques. A reconfigurable computing architecture can be "recoded" (reprogrammed or reconfigured) to adapt the architecture to a variety of computational approaches. In addition, the reconfigurable architecture approaches can implement an underlying high-performance hardware architecture. Reconfigurable architectures may be arranged for applications that require high performance computing, then rearranged for the many other applications. Applications, including digital signal processing (DSP), medical image processing, audio processing and compression, machine learning, matrix computations, tensor computations, image data analysis, and so on, are successfully enabled by reconfigurable architecture capabilities. The reconfigurable architecture approach is particularly well suited to data analysis when the data can include specific types of data, large quantities of unstructured data, sample data, and the like. The reconfigurable architecture can be configured to achieve these and other processing techniques.

SUMMARY

Image data, audio data, online usage data, and so on, is routinely processed for a wide range of applications. The processing can be applied to media production, image processing, machine vision, audio compressing or streaming, and so on. The data to be processed can include mixed-precision data, where the data can include single-precision or double-precision floating-point data, reduced-precision floating-point data, integer or long integer data, characters, and the like. The data can include 8-bit signed or unsigned integer data, image data, or RGB image data. Whichever precision or numerical representation is used, the data can be manipulated within a layer of a neural network. The neural network is particularly well suited to the processing of data such as image data because the neural network can be trained prior to applying the data analysis techniques to unprocessed data. The training of the neural network is based on using "known good" data. The training enables the neural network to classify the data, where the classifying can include identifying or "classifying" objects, people, animals, purchasing trends, etc. Further, the neural network can modify, adapt, or learn as additional data is provided to the neural network for processing, thus improving the efficacy of the neural network.

A neural network is based on processors, where the processors can support mixed-precision operations or operations on other numerical representations. Input data to the neural network can include a left group of eight bytes and a right group of eight bytes, an input data element block, etc. The input data can include 8-bit integer data, fixed-point numerical representations of the data, and so on. A floating-point representation can include a reduced-precision floating-point representation, a block-float floating-point representation, etc. The choice of number representation impacts computational resources such as storage and processing requirements. Further, the choice among using lower precision or higher representations, whether integer representations or floating-point representations, can present the advantages of reduced storage and computation requirements, faster processing rates, faster convergence, and the like. Conversion of results from data operations to shorter representations using truncation or rounding further impacts computational efficiency and numerical accuracy. In embodiments, an input for a subsequent operation, such as a sum of products operation, is converted to another format before using. The input data, whether converted or not, can be manipulated using processors, where the processors can be related to a neural network. Other input data can include neural network weights, biases, or activations. The manipulation can comprise a multiply and accumulate operation. The manipulation can include a unary operation, a binary operation, or a conversion operation. The results of the manipulating are forwarded to a next layer within the neural network. The next layer can include a hidden layer, a convolutional layer, an activation layer, a bottleneck layer, or an output layer.

Embodiments include a processor-implemented method for data manipulation comprising: obtaining a first left group comprising eight bytes of data and a first right group of eight bytes of data for computation using a processor; obtaining a second left group comprising eight bytes of data and a second right group of eight bytes of data; performing a sum of products between the first left and right groups and the second left and right groups, wherein the sum of products is performed on bytes of 8-bit integer data, and wherein: a first result is based on a summation of eight values that are products of the first group's left eight bytes and the second group's left eight bytes; and a second result is based on the summation of eight values that are products of the first group's left eight bytes and the second group's right eight bytes; and outputting the first result and the second result as four-byte results, based on the performing. The method further includes outputting a third result and a fourth result, wherein the third result is based on a summation of eight values that are products of the first group's right eight bytes and the second group's left eight bytes, and the fourth result is based on a summation of eight values that are products of the first group's right eight bytes and the second group's right eight bytes.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 4 illustrates (2×8)*(8×2) matrix multiplication and addition.

DETAILED DESCRIPTION

Figure 1:
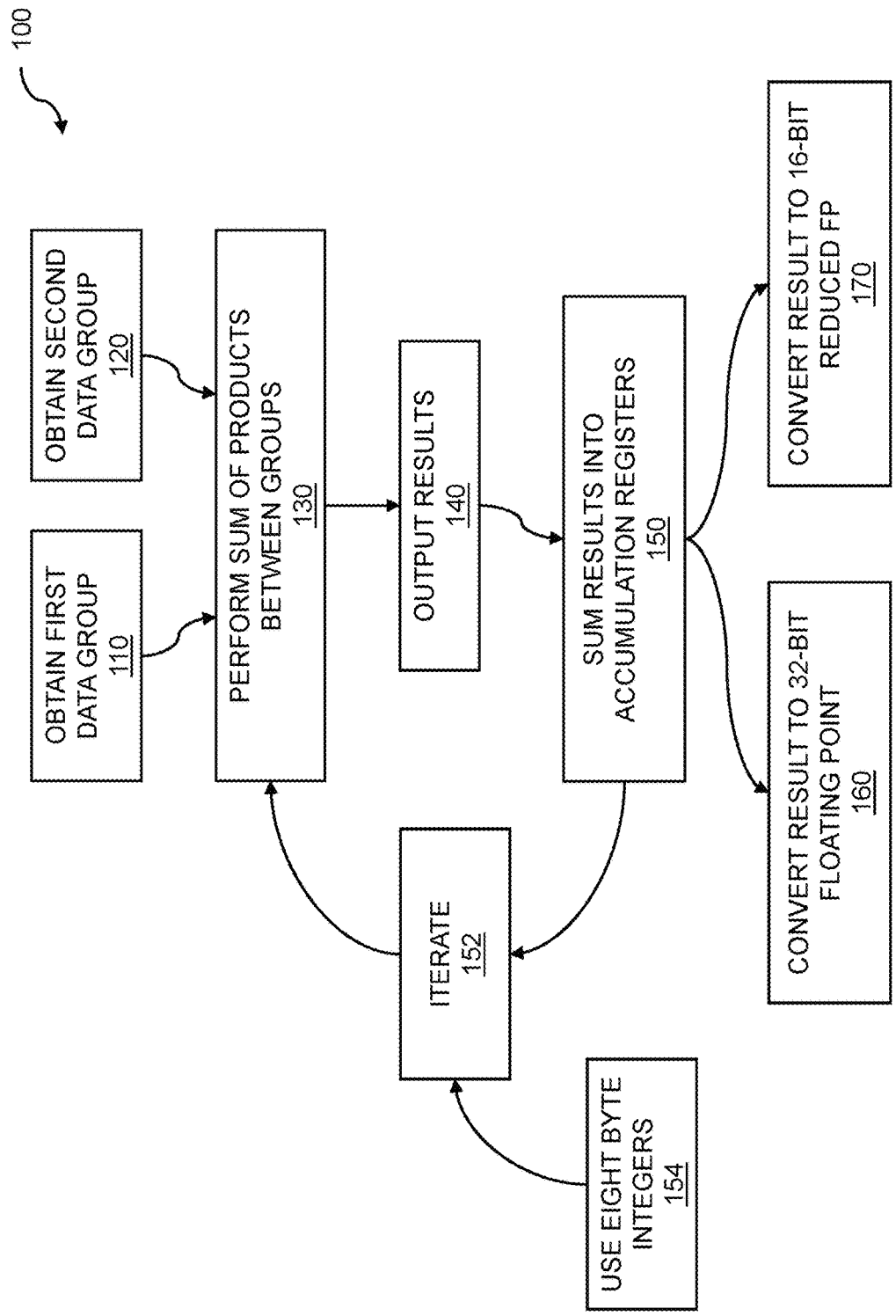
FIG. 1 is a flow diagram for neural network data computation using mixed-precision.

Neural network data computation using mixed-precision computation can be performed for data manipulation. A mixed-precision data representation can be chosen for use by a neural network to reduce computational complexity, to increase processing speed, to reduce storage requirements, to improve convergence, and so on. Processing networks, including neural networks, can be applied to a wide variety of data manipulation applications such as machine learning, deep learning, image processing, audio processing, medical diagnostics, surveillance, and business analytics, among many others. Several construction techniques and network topologies have been proposed for implementing neural networks. Common techniques include deep neural networks (DNNs), convolutional neural networks (CNNs), recurrent neural networks (RNNs), etc. The choice of which technique to use for implementing a given neural network can be driven by the type of data that will be processed by the neural network. In a usage example, a neural network user may choose a CNN for processing image data, based on the demonstrated-good results from prior CNN usage. The CNN configuration mimics the organization of the visual cortex of humans or other animals. The CNN can be an excellent choice for image processing applications since the CNN can require minimal preprocessing of data prior to the data processing by the CNN. The CNN can include beneficial characteristics such as shift invariance or space invariance.

Techniques for neural network data computation using mixed-precision are disclosed. A mixed-precision data representation can include integer data, single- or double-precision data, reduced-precision data, block-float data, and so on. A first left group comprising eight bytes of data and a first right group of eight bytes of data are obtained for computation using a processor. A second left group comprising eight bytes of data and a second right group of eight bytes of data are obtained. The processor can perform operations such as multiply accumulate (MAC) operations. The processor can support mixed-precision operations, integer operations, and floating-point operations of other numerical representations. The processor can include a computing device, a server device, a processing device, and the like. The processor can include a CPU or GPU, programmable logic, application-specific integrated circuits (ASICs), arithmetic processors, and the like. The processor can include clusters of elements within a reconfigurable computing environment. The processor can be based on one or more processing elements within a reconfigurable fabric, a field programmable gate array, an application specific integrated circuit, etc. A sum of products between the first left and right groups and the second left and right groups is performed. The sum of products is performed on bytes of 8-bit integer data. The sum of products can be performed on data based on other numerical representations such as reduced-precision floating-point data. The sum of products can be performed within a layer of a neural network.

The neural network calculations can include addition, subtraction, dot-product, convolution, and the like. The neural network can perform the sum of products between the first left and right groups and the second left and right groups. A first result can be based on a summation of eight values that are products of the first group's left eight bytes and the second group's left eight bytes. A second result can be based on the summation of eight values that are products of the first group's left eight bytes and the second group's right eight bytes. The results of the performing can be stored, output, and so on. The first result and the second result can be output as four-byte results. The four-byte results can be formed by truncating or rounding a result of performing a sum of products. Further results may be output. A third result and a fourth result are output, where the third result is based on a summation of eight values that are products of the first group's right eight bytes and the second group's left eight bytes, and the fourth result is based on a summation of eight values that are products of the first group's right eight bytes and the second group's right eight bytes. The results can be forwarded to a next layer of the neural network without data representation conversion. The next layer of the neural network can include a hidden layer, a convolution layer, a bottleneck layer, an activation layer, an output layer, etc.

FIG. 1 is a flow diagram for neural network data computation using mixed-precision. The neural network accomplishes data manipulation. A mixed-precision data representation can be used to facilitate neural network calculations by reducing neural network complexity, by reducing data storage requirements, by accelerating data manipulation, etc. The data manipulation can be performed without loss of computational precision. The data manipulation is performed on a processor, where the processor is used for neural network calculations. The neural network can include a plurality of layers. A layer of the neural network can be implemented within a configurable hardware such as a field programmable gate array (FPGA), an application specific integrated circuit (ASIC), and so on. In embodiments, the layer of the neural network can include one or more elements within a reconfigurable fabric. The reconfigurable fabric can include a variety of elements. In embodiments, the elements within the reconfigurable fabric can include processing elements, switching elements, or storage elements. The elements of the reconfigurable fabric can be controlled. In embodiments, the elements within the reconfigurable fabric are controlled by one or more circular buffers. The elements of reconfigurable fabric can be configured by coding, programming, scheduling, etc. In embodiments, the one or more circular buffers are statically scheduled. The static schedules that control the circular buffers can represent kernels, agents, algorithms, and so on. In embodiments, the schedules that control circular buffers can be dynamically updated.

The flow 100 includes obtaining a first left group comprising eight bytes of data and a first right group of eight bytes of data 110 for computation using a processor. The first left group and the first right group can be obtained from storage such as DMA storage, remote DMA (RDMA) storage and so on. The first left group and the first right group can be uploaded by a user, downloaded over the Internet, etc. The processor can be used for neural network calculations. A neural network can comprise a plurality of layers, where the layers can include input layers, output layers, convolutional layers, hidden layers, bottleneck layers, and so on. Various techniques can be used to implement the neural network. In embodiments, the neural network can include a deep neural network (DNN), a convolutional neural network (CNN), a recurrent neural network (RNN), and the like. The processor can support 8-bit integer operations, single-precision or double-precision operations, etc. The neural network calculations can include a variety of operations, where the operations can include logical operations, mathematical operations, matrix operations, tensor operations, and so on. The operations can include image processing operations. The flow 100 includes obtaining a second left group comprising eight bytes of data and a second right group of eight bytes of data 120. The second left group and the second right group can be similarly obtained from storage, uploaded, downloaded, etc. The left group and the right group can be based on various data representations. In embodiments, the left and right groups of data can be unsigned data. The unsigned data can include unsigned integer data, unsigned long integer data, etc. In other embodiments, the left and right groups of data can be signed data. The signed data can include two's complement data. The signed data can include variable radix point data. In embodiments, at least one of the first group and the second group can represent image data. Various types of image data can be represented. In embodiments, the image data comprises unsigned integer image data. The unsigned integer image data can represent an intensity ranging from black to white. In other embodiments, the image data comprises RGB image data.

The first left and right groups and the second left and right groups can represent image data, audio data, and so on. The first and second groups of data may further include training data for the neural network, where the training can include known good data, weights, biases, activations, etc. The known good data can be used to train the neural network. The neural network can be trained in order to improve the efficacy of processing input data such as image data, audio data, etc. The first and second groups of data can include one or more neural network biases. The one or more neural network biases can include a reduced-precision representation, a single-precision representation, etc. The first and second groups of data can include a neural network activation. The neural network activation can include a rectified linear unit (ReLU) activation. The neural network, such as a DNN, CNN, RNN, etc., can be trained using a dataset of known values chosen for the training techniques. Neural network training based numerical representations such as bfloat16, binary32, or binary64, can be computationally intensive due to the processing overhead associated with computations based on floating point numbers. Once trained, the neural network can be used to process the input data and to make inferences based on the input data. Inferencing techniques are also computationally intensive when the computations are based on floating-point numbering representations. Low precision computations can be used in place of the floating-point computations. Low-precision inferencing can be based on 8-bit integer numbering representations, particularly when applied to inferencing based on a CNN. The 8-bit integer values can be manipulated with low computational overhead, permitting inferencing to be performed quickly. In further embodiments, activations within the neural network calculations can be kept in a 32-bit floating-point representation.

Discussed throughout, data based on a numbering representation can be converted to data based on a second numbering representation. Data represented as an 8-bit unsigned integer can be converted to bfloat16, binary32, etc.; bfloat16 can be converted to binary32, binary64; single-precision floating point can be converted to block-float or other numbering representations; etc. Operations that support either converting numbering representations or operating on operands based on different numbering representations can be included. A block-float operand can be operated on using techniques similar to those used to operate on single-precision operands. The block-float operand can be expanded to a single-precision representation. Operations based on single-precision representations can be executed. When the operations include training a neural network such as a CNN, then the weights, biases, etc., can be back-propagated to previous layers within the neural network. Other embodiments can encompass operations that include hybrid data type support or mixed-precision data type support. The hybrid data type can include single-precision values and low-precision or integer values. The operations can include matrix operations such as column major operations, row major operations, and the like. To execute the various neural network calculations, the input data can remain in the representation in which it is read, or can be converted, factored, translated, etc., to a different representation. For example, 8-bit integer representation can be converted to a 16-bit reduced floating-point representation element to facilitate the manipulating. The factoring can be performed so that the first input data group and the second input data group are each based on the same representation.

The flow 100 includes performing a sum of products 130 between the first left and right groups and the second left and right groups, wherein the sum of products is performed on bytes of 8-bit integer data. A sum of products can be computed between two equal length sequences of numbers. Sequences of unequal lengths can be padded with values such as zero to attain the equal lengths. As the name implies, a sum of products can be computed by calculating products between corresponding values within the two sequences of numbers. The products can be added together to calculate the desired sum of the products. Based on the four groups of data, the first left group, the first right group, the second left group, and the second right group, four results comprising sums of products can be calculated. In embodiments, a first result can be based on a summation of eight values that are products of the first group's left eight bytes and the second group's left eight bytes. The sums of products can be calculated using one or more multiply accumulate (MAC) units. A second result can be based on the summation of eight values that are products of the first group's left eight bytes and the second group's right eight bytes. The second result can be calculated in parallel with the first result, sequentially (before or after) with respect to the first result, and so on. A third result is based on a summation of eight values that are products of the first group's right eight bytes and the second group's left eight bytes. A MAC can be allocated to computing the third result, shared with one or both of the first and second results, etc. A fourth result can be based on a summation of eight values that are products of the first group's right eight bytes and the second group's right eight bytes. The first, second, third and fourth results can be stored, forwarded to another MAC unit, forwarded to another layer within the neural network, and so on. In embodiments, an 8-bit byte can be replaced by other data representation lengths, such as a 16-bit half word representation.

The flow 100 includes outputting 140 the first result and the second result as four-byte results, based on the performing. The outputting can include outputting from the processor, one or more MAC units, and the like. As stated, the outputting can include storing results, forwarding or transferring the result to another layer within the neural network, etc. In embodiments, the performing and the outputting can include a layer within a neural network. The outputting can include outputting further results. In embodiments, the outputting further results includes outputting the third result and the fourth result. Recall that the third result can be based on a summation of eight values that are products of the first group's right eight bytes and the second group's left eight bytes, and the fourth result can be based on a summation of eight values that are products of the first group's right eight bytes and the second group's right eight bytes. The performing and the outputting can accomplish a variety of processing or computation objectives. In embodiments, the performing and the outputting can include a reduction operation. A reduction operation can include reducing or combining data. In embodiments, the reduction operation can be a dot-product calculation. The dot-product calculation or other calculation can be performed as part of an algorithm, a process, a heuristic, and so on. In embodiments, the reduction operation can be used for machine learning. The machine learning can include deep learning. In other embodiments, the obtaining a first group, the obtaining a second group, the performing, and the outputting are used to perform a 2×8*8×2 matrix multiplication.

In embodiments, the first result, the second result, the third result, and the fourth result comprise a 2×2 word matrix. Placement of the results within the 2×2 word matrix can be predetermined or defined. Recall that the positions of elements within a matrix such as the 2×2 matrix can be defined such that the upper left hand element is denoted by (0, 0), the lower right hand element by (1, 1) and so on. In embodiments, the first result can be contained in element (0, 0) of the word matrix. Continuing with this nomenclature, the second result can be contained in element (0, 1) of the word matrix. Elements (0, 0) and (0, 1) can correspond to the first row of the 2×2 word matrix. Continuing with the 2×2 matrix, the third result can be contained in element (1, 0) of the word matrix. To complete the 2×2 word matrix, the fourth result can be contained in element (1, 1) of the word matrix. The 2×2 word matrix can be loaded into storage, output, used for further computations, etc. Further embodiments can include using the word matrix as input for a subsequent sum of products operation. The word may be used directly or may require processing, conversion, and so on. In embodiments, the input for a subsequent sum of products operation can be converted to another format before the using.

The flow 100 further includes summing the first, second, third, and fourth results into four accumulation registers 150. An accumulation register can include an adder coupled to a register, where the adder can be used to add a value to the value stored in the register. The sum resulting from adding the value to the register value can be stored in the register. The first result can be added to the first accumulation register, the second result can be added to the second accumulation register, the third result can be added to the third accumulation register, and the fourth result can be added to the fourth accumulation register. In embodiments, the accumulation registers can accomplish a read-modify-write operation. The values within the accumulation registers can be set to a certain value. In embodiments, the four accumulation registers can be initialized or "reset" to zero. One or more of the accumulation registers need not necessarily be initialized prior to a given accumulation operation.

In embodiments, at least one of the four accumulation registers can contain a result from a previous sum of products operation.

The flow 100 includes iterating 152 the obtaining, the performing, and the outputting to complete a tensor operation on greater than 32 bytes of input data. While multiply-accumulate operations can be described for two equal length sequences of numbers, other numbers of multiply-accumulate operations can be performed on matrices, tensors, and so on. In embodiments, the MAC operations can be based on submatrices of matrices, tensors, and the like. Described previously, the first left group, the first right group, the second left group, and the second right group can each include eight bytes of data 154. Other numbers of bytes of data can be used. In embodiments, the first left group, the first right group, the second left group, and the second right group each include more than eight bytes of data. The results based on summations of products of the various groups of input bytes can be converted to a variety of signed or unsigned integer representations, various precision representations, and so on. The flow 100 includes converting results to a 32-bit floating point 160. Results can be converted from a format such as signed or unsigned integer representation, from a fixed radix point representation, etc., to a single-precision floating-point representation. The conversion can be accomplished by determining an exponent and formatting a fraction. The conversion can be based on converting from a representation with fewer bits than can be included in the 32-bit floating-point representation. The fraction can be padded with ones or zeros to fill out the fraction. The choice of filling with ones or zeros can be based on a sign bit. The flow 100 includes converting results to a 16-bit reduced floating-point 170 representation. The 16-bit reduced floating-point representation comprises fewer fraction bits than other floating-point representations such as single-precision or double-precision floating point. The reduced floating-point representation can be accomplished by truncating or rounding the fraction.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
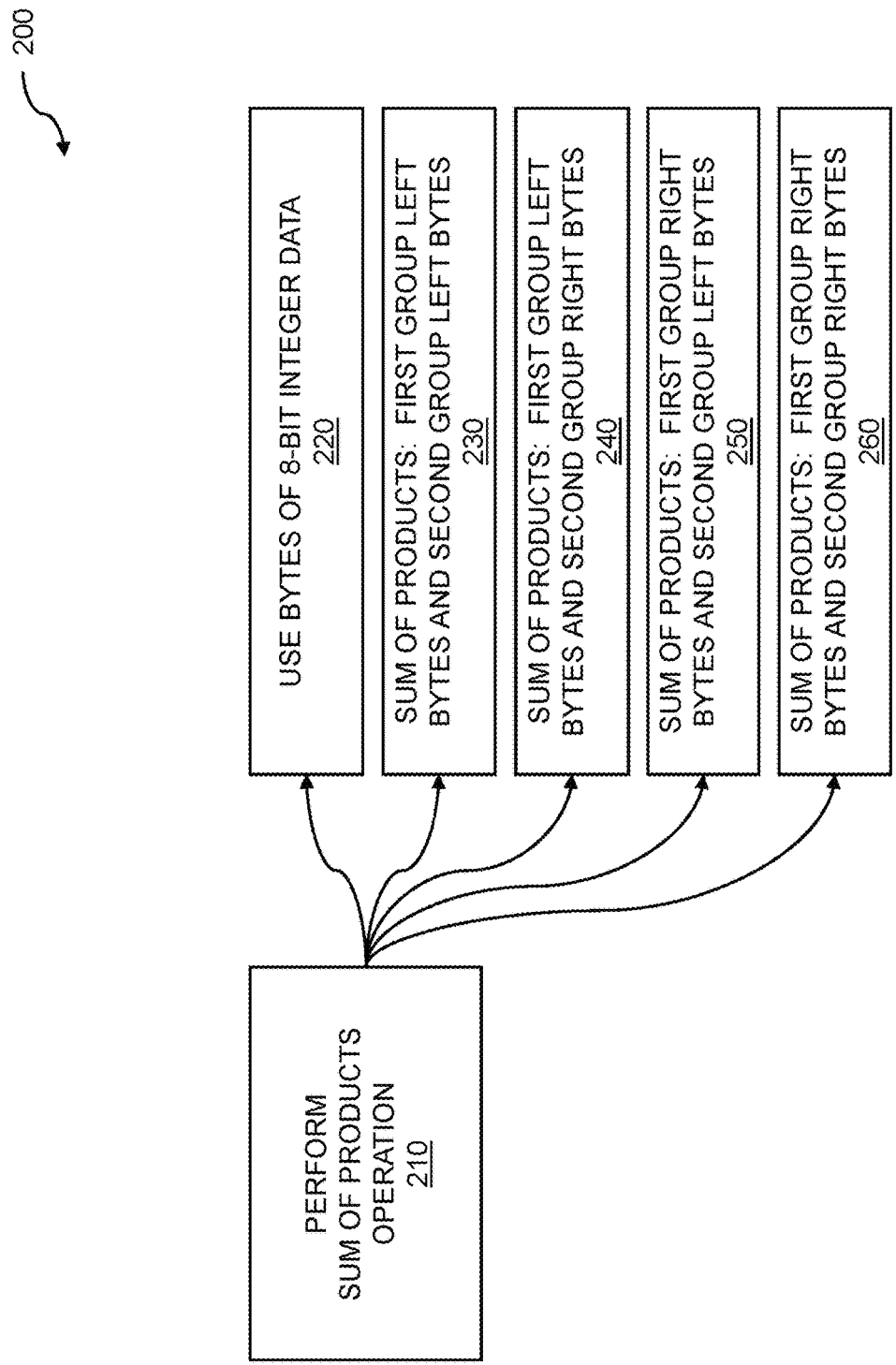
FIG. 2 is a flow diagram for performing a multiply-accumulate operation.

FIG. 2 is a flow diagram for performing a multiply-accumulate operation. A multiply-accumulate operation is based on computing the product of two numbers and adding the product to a running total or "accumulation". An accumulator can perform the accumulation operation. An accumulator is based on an adder and a register, where the register holds the running total. Multiply-accumulate operations enable neural network data computation using mixed-precision. A first left group comprising eight bytes of data and a first right group of eight bytes of data are obtained for computation using a processor. A second left group comprising eight bytes of data and a second right group of eight bytes of data are obtained. A sum of products is performed between the first left and right groups and the second left and right groups. The first result and the second result are output as four-byte results.

The flow 200 includes performing a sum of products operation 210. Discussed throughout, a sum of products operation uses a multiplier to compute the product of two numbers and adds the product of the two numbers to an accumulator. The accumulator adds the product to other products which may have been computed previously. The multiplication and the accumulation can be based on various numbering formats. The numbering format used for the first input data element and the numbering format used for the second input data element need not be the same. The numbering formats or representations can include integer representations such as a signed or unsigned 8-bit integer; a signed or unsigned long integer; a 16-bit reduced floating-point representation such as bfloat16; a single-precision floating-point representation such as binary32; a double-precision floating-point representation such as binary64; and so on. The number representation can include a block-float representation. Other signed or unsigned integer representations, such as 16-bit or 32-bit integer representations, or other floating-point representations, can also be used. The numbers to be manipulated by the multiply-accumulate operation can include mixed-precision numbers. In embodiments, the first input data element block can include eight bytes of data, while a result of the multiply-accumulate operation can include four bytes. The reduced-precision results can be particularly well suited to neural network calculations due to smaller computational resource requirements.

In the flow 200, the sum of products is performed on bytes of 8-bit integer data 220. The 8-bit integer data can include signed 8-bit data, unsigned 8-bit data, two's complement 8-bit data, and so on. The 8-bit data can represent fixed radix-point data or variable radix-point data. In the flow 200, a first result of the sum of products can be based on a summation of eight values that are products of the first group's left eight bytes and the second group's left eight bytes 230. The first group's left eight bytes and the second group's left eight bytes can be obtained from storage, where the storage can include a storage element within a reconfigurable fabric, DMA storage, remote DMA storage, and the like. In the flow 200, a second result can be based on the summation of eight values that are products of the first group's left eight bytes and the second group's right eight bytes 240. The calculation of the second result can be performed sequentially to or in parallel with the calculation of the first result. The first result and the second result can be output. The outputting can include transferring results between layers of a neural network, storing results, and so on. In embodiments, the outputting is based on four-byte results. In embodiments, the outputting includes outputting a third result and a fourth result. In the flow 200, the third result is based on a summation of eight values that are products of the first group's right eight bytes and the second group's left eight bytes 250. The third result can be calculated using a MAC allocated to the calculations, a MAC shared for other calculations, etc. In the flow 200, the fourth result can be based on a summation of eight values that are products of the first group's right eight bytes and the second group's right eight bytes 260. As for the outputting the first result and the second result, the outputting the third result and the fourth result can include transferring the result to a layer within the neural network, placing the result in storage, etc.

The performing various sums of product operations or other data manipulation operations can be accomplished using one or more processors that support 8-bit integer operations, single-precision operations, or other number representation operations. The operations that can be performed can include a neural network operation. Noted throughout, the neural network can include a plurality of layers, where the plurality of layers can include one or more of an input layer, an output layer, a fully connected layer, a convolutional layer, a pooling layer, a rectified linear unit (ReLU) layer, a bottleneck layer, and so on. The neural network layers between the input layers and the output layers can include hidden layers. The manipulating can include performing one or more operations on the input data groups.

The performing or manipulating can execute neural network calculations or operations, where the operations can include logical operations, mathematical operations, matrix operations, tensor operations, and so on. The manipulating includes sum or product operations. The manipulating can be performed on a processor within a neural network. The input data to the neural network can include data such as image data, neural network weights or biases, etc. The weights within the neural network can be used to assign a relative importance of an input to a neuron within a layer of the neural network. The weights can be trained using single-precision data representations. A neural network bias can include a node with a constant value such as one. The bias node can be used to ensure that the output of an element (neuron, perceptron, etc.) of a neural network does not always converge to a value such as zero. The input data can include one or more neural network activations. A neural network activation, or activation function, can be used to determine whether a given neuron within the neural network should be activated. The activation can be determined based on calculating a weighted sum of the inputs and adding a bias to the weighted sum. The activation can introduce nonlinearity to the output of a neuron within the neural network. The neuron can be located within a hidden layer of the neural network.

The representation or representations used for the first left and right groups and the second left and right groups can be determined based on a neural network operation, where the neural network operation can include a neural network calculation. Neural network calculations can be used for variety of data manipulation tasks. For example, the neural network calculation can be performed on a training set of data comprising "known" values, in order to train the neural network to perform specific data manipulation tasks. The data representations can include 8-bit integer data. Other representations may also be used. In other embodiments, the second input data element block can include 8-bit integer representation elements. The 8-bit integer representations can include a signed or an unsigned 8-bit integer representation. In embodiments, the 8-bit integer representation can include image data. Translations or factoring of one or more input data elements can be required for certain data processing or manipulating applications.

A variety of techniques can be used for the translating, factoring, etc., of data based on one representation to another representation. Input data elements based on an 8-bit integer representation can be expanded to a long integer representation, to a single-precision floating-point representation (binary32, fp32, etc.), to block-float representations, etc. The expanding can include padding with zeros or ones depending on a sign bit. The resulting representation can be used for data manipulations, neural network calculations, etc., based on or appropriate to the representations. Another translation or factoring can include expanding an 8-bit integer. The 8-bit integer can be expanded to a reduced floating-point representation such as bfloat16, a single-precision floating point representation such as binary32 or fp32, and the like. One representation is translated or factored to another representation to support neural network calculations. The neural network calculations can generate sums, differences, products, quotients, etc., that can be based on one or more data representations. A calculation based on mixed representations, such as a calculation that includes addition or subtraction operations including a bfloat16 element and a binary32 element, can yield a binary32 or fp32 result. An addition or subtraction operation including two bfloat16 elements can yield an fp32 result. The fp32 result may require padding with one or more zero bits. Multiplication between two data elements typically yields representations including larger numbers of bits. In embodiments, a multiplication or a dot-product operation between two data elements based on a 16-bit representation yields an fp32 result. Similarly, a multiplication or dot-product operation between a 16-bit representation and an 8-bit integer representation yields a single-precision or fp32 result.

Figure 3:
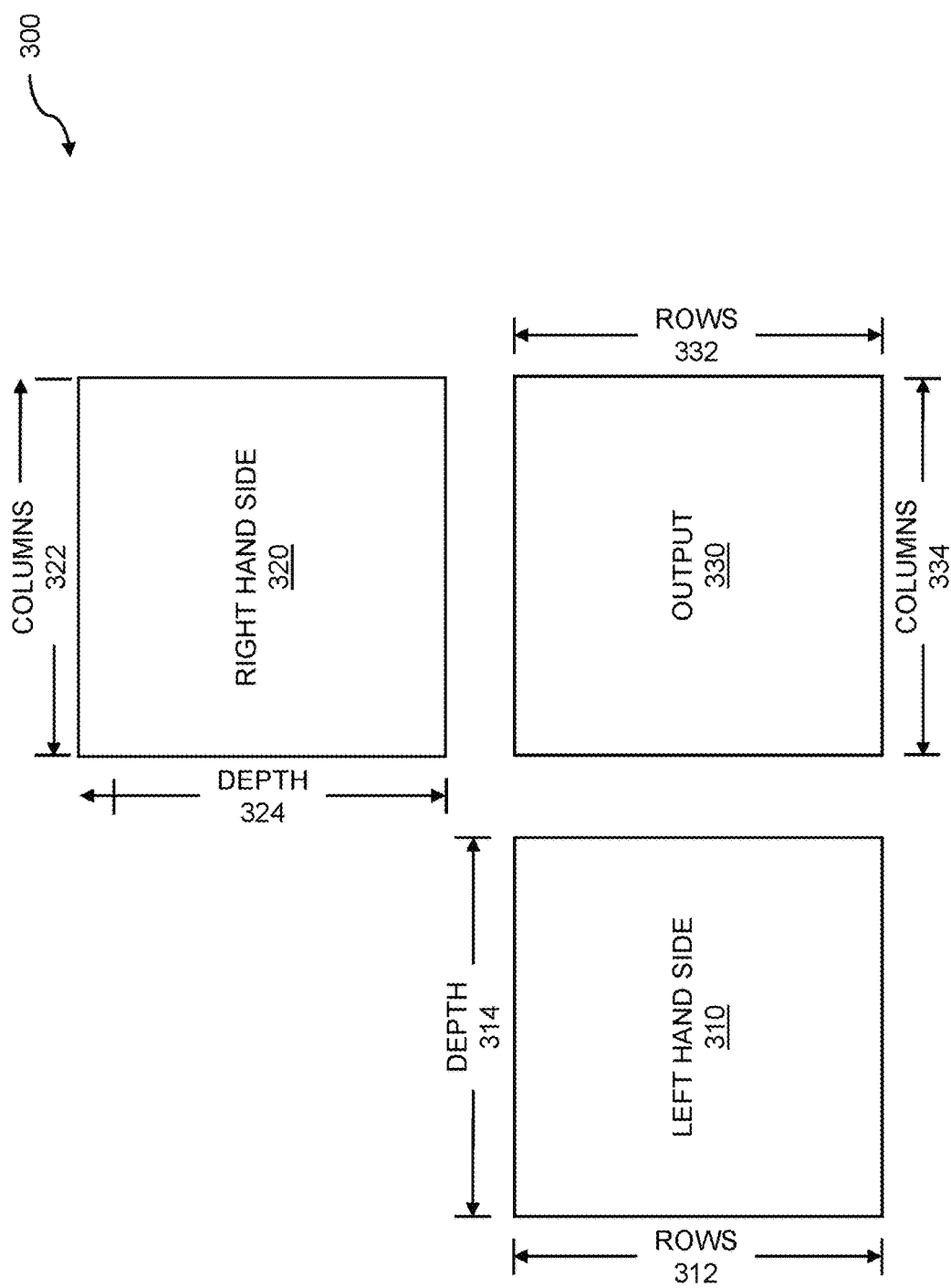
FIG. 3 shows matrix multiplication.

FIG. 3 shows matrix multiplication. Matrix multiplication can be performed between two matrices such as A and B, where the result of the matrix multiplication is a product matrix C. The dimensions of the product matrix are based on the dimensions of matrices A and B. Given dimensions of matrix A to be (n×k), and the dimensions of matrix B to be (k×m), then the dimensions of the product matrix C are (n×m). Matrix multiplication operations can be applicable to a variety of applications including neural network computations. Matrix multiplication enables neural network data computation using mixed-precision. A first left group of eight bytes of data and a first right group of eight bytes of data are obtained for computation using a processor. A second left group of eight bytes of data and a second right group of eight bytes of data are also obtained. A sum of products is performed between the first left and right groups and the second left and right groups. The first result and the second result are output as four-byte results, based on the performing.

Matrix multiplication is shown 300. Discussed above, the dimensions of a matrix, such as (n×m), indicate the number of rows of a matrix and the number of columns of the matrix, respectively. Matrix multiplication can be performed by computing a dot product between two equal length vectors, where a vector can represent a row of a matrix or a column of a matrix. A dot-product computation is based on multiplying corresponding elements of the two vectors, then adding the products together. This "sum of products" technique is repeated, where the dot product is calculated between the first row of the first matrix A and each column of the second matrix B, the second row of the first matrix and each column of the second matrix, and so on. The resulting sums of products are placed into the product matrix, such as C. In the figure, the left hand side 310 includes a number of rows 312 and a depth 314. The number of rows can represent the number of rows, n, in the first matrix or other matrix. The depth can indicate a number of columns k of the first matrix or other matrix. In embodiments, the depth can correspond to a number of multiply-accumulate (MAC) components. The MAC units can be operated in parallel to reduce processing time. The right hand side 320 can include a number of columns 322 and a depth 324. The depth 324 can be substantially similar to the depth 314. The number of columns can represent the number of columns, k, of the second matrix or other matrix.

An output matrix 330 includes a number of rows 332 and a number of columns 334. The number of rows 332 can be substantially similar to the number of rows 312. The number of columns 334 can be substantially similar to the number of columns 322. Each element of the output matrix can be computed by performing a sum of products between a row of the first matrix and a column of the second matrix. If we label elements of the output matrix based on their positions within the output matrix, then the upper left hand element of the output matrix can be labeled (0, 0), and the lower right hand element of the output matrix can be labeled (n, m). The labels for each element of the output matrix correspond to a dot-product computation between a corresponding row from the first matrix and a corresponding column from the second matrix. The upper left hand element of the output matrix corresponds to a dot-product computation between the first row of the first matrix and the first column of the second matrix. Similarly, the lower right hand element of the output matrix corresponds to a dot-product computation between the $n^{th}$ row of the first matrix and the $m^{th}$ column of the second matrix.

Figure 4:
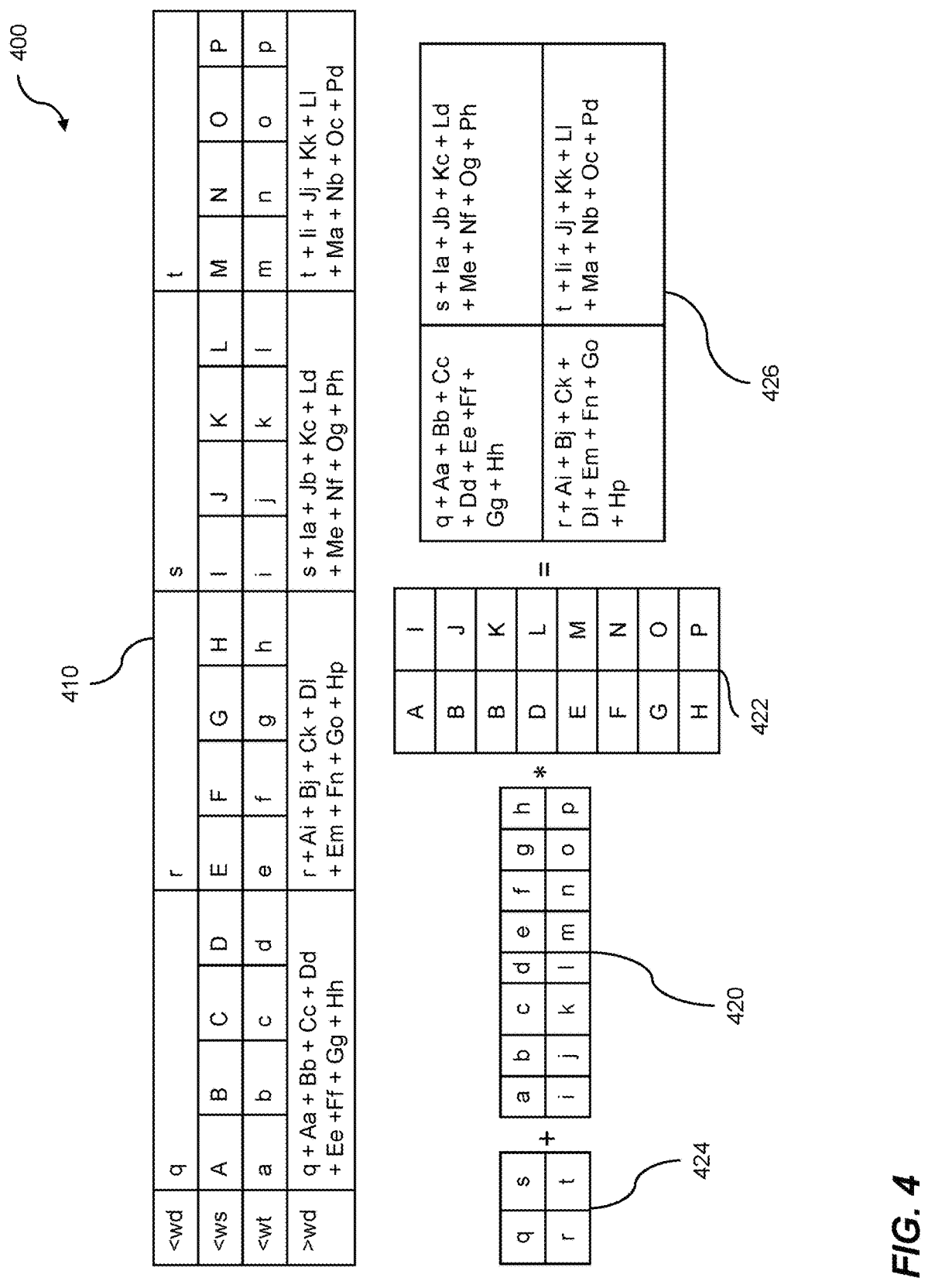

FIG. 4 illustrates (2×8)*(8×2) matrix multiplication and addition. Multiply-accumulate and multiply-add operations are based on matrix multiplication and matrix addition operations. Noted throughout, the data can include 8-bit integer data, reduced-precision floating-point data, single-precision or double-precision floating-point data, and so on. The matrix multiplication and addition enable neural network data computation using mixed-precision. A first left group comprising eight bytes of data and a first right group of eight bytes of data are obtained for computation using a processor. A second left group comprising eight bytes of data and a second right group of eight bytes of data are obtained. A sum of products is performed between the first left and right groups and the second left and right groups, where the sum of products is performed on bytes of 8-bit integer data. The first result and the second result are output as four-byte results. In embodiments, at least one of the obtaining a first group, the obtaining a second group, the performing, and the outputting can be designated by an instruction mnemonic including DPOADD. The DPOADD instruction mnemonic can include a dot product operation and an addition operation based on 8 bytes (octet) of data for each of the first group and the second group.

Matrix computations, such as dot-product computations, are based on matrix multiplication, matrix addition, and so on. The dot-product computations can also be associated with neural network data computations. The neural network data computations can be based on mixed-precision. In the example 400, table 410 shows elements of a first matrix, elements of a second matrix, elements of a third matrix, and elements of a result matrix. The matrices include the first matrix with dimensions 2×8 420; the second matrix with dimensions 8×2 422; and the third matrix with dimensions 2×2 424. The result matrix, 426, is calculated using a dot-product computation between the first matrix and the second matrix, and a matrix addition operation between the dot product results and the third matrix. The dot-product operation is performed by computing a product for each element of a row of the 2×8 matrix 420 and each element of a column the 8×2 matrix 422. The computed products are added together (a sum of products). For example, the dot product of the first row of 420 and the first column of 422 includes part of the computation for the upper left element (0, 0) of the result matrix 426; the dot product of the first row of 420 and the second column of 422 includes part of the computation for the upper right element (0, 1) of 426, and so on. The matrix addition operation, which is computed by adding matrix 424 to the dot-product results, completes the computation of the result matrix 426 for this example. The matrix addition is calculated by adding element (0, 0) of 424 to element (0, 0) of the corresponding element computed for the dot-product calculation; element (0, 1) of 424 is added to the corresponding element for the dot-product calculation; etc. Note that for the matrix multiplications to be performed correctly, the number of columns of the first matrix is equal to the number of rows of the second matrix. Thus, when a (2×8) matrix is being multiplied by an (8×2) matrix, the resulting matrix is a (2×2) matrix. Rows and columns of matrices can be padded if necessary so that the matrices meet the size criteria. Further, to add two matrices, the dimensions of the matrices must be equal. A padding technique can be used to meet the dimensional requirements.

Figure 5A:
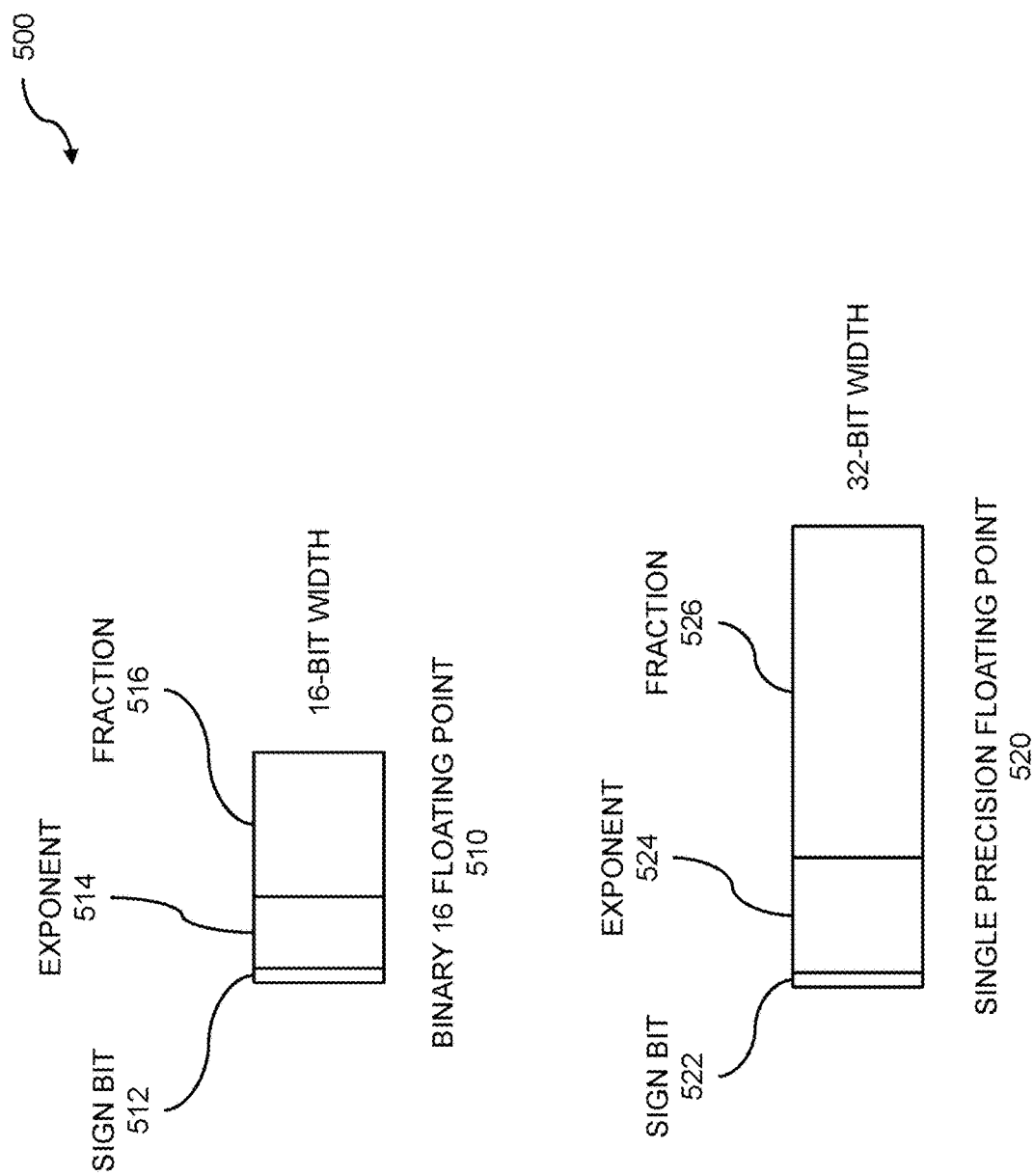
FIG. 5A shows conversion from bfloat16 to single-precision.

FIG. 5A shows conversion from bfloat16 for single precision. Data can be represented based on a variety of numerical representations such as single-precision or double-precision floating-point representations, a reduced-precision floating-point representation, and so on. The data can be represented in various integer representations as well, including signed or unsigned integer representations. The data can be manipulated by a processor, based on various data manipulation operations such as logical operations, arithmetic operations, matrix operations, tensor operations, and the like. The data representation can support neural network data computation using mixed-precision. A first left group comprising eight bytes of data and a first right group of eight bytes of data are obtained for computation using a processor. A second left group comprising eight bytes of data and a second right group of eight bytes of data can be obtained. A sum of products can be performed between the first left and right groups and the second left and right groups, where the sum of products can be performed on bytes of 8-bit integer data. The first result and the second result can be output as four-byte results, based on the performing. A third result and a fourth result can be further output, where the third result is based on a summation of eight values that are products of the first group's right eight bytes and the second group's left eight bytes, and the fourth result is based on a summation of eight values that are products of the first group's right eight bytes and the second group's right eight bytes.

Two floating-point representations are shown 500. The floating-point representations can include a 16 floating-point (bfloat16) representation 510, and a single-precision floating-point (binary32) representation 520. Other floating-point representations, such as a double-precision floating point (binary64) may also be used. The bfloat16 representation comprises a sign bit 512, an 8-bit field for an exponent 514, and a 7-bit field for a fraction or significand 516. While only seven bits of the significand are stored, the storing the significand can support eight bits of precision. The binary32, or single-precision, representation comprises a sign bit 522, an 8-bit field for an exponent 524, and a 23-bit field for the fraction or significand 526. The bfloat16 representation and the binary32 representation differ in the number of bits of the significand, and the precision of the significand. To convert from the binary32 to the bfloat16 representation, the significand can be truncated or rounded to fit within the reduced number of bits. To convert from the bfloat16 to the binary32 representation, the significand can be padded with ones or zeros to fill out the increased number of bits. The padding with ones or zeros can be determined based on the sign bit.

Figure 5B:
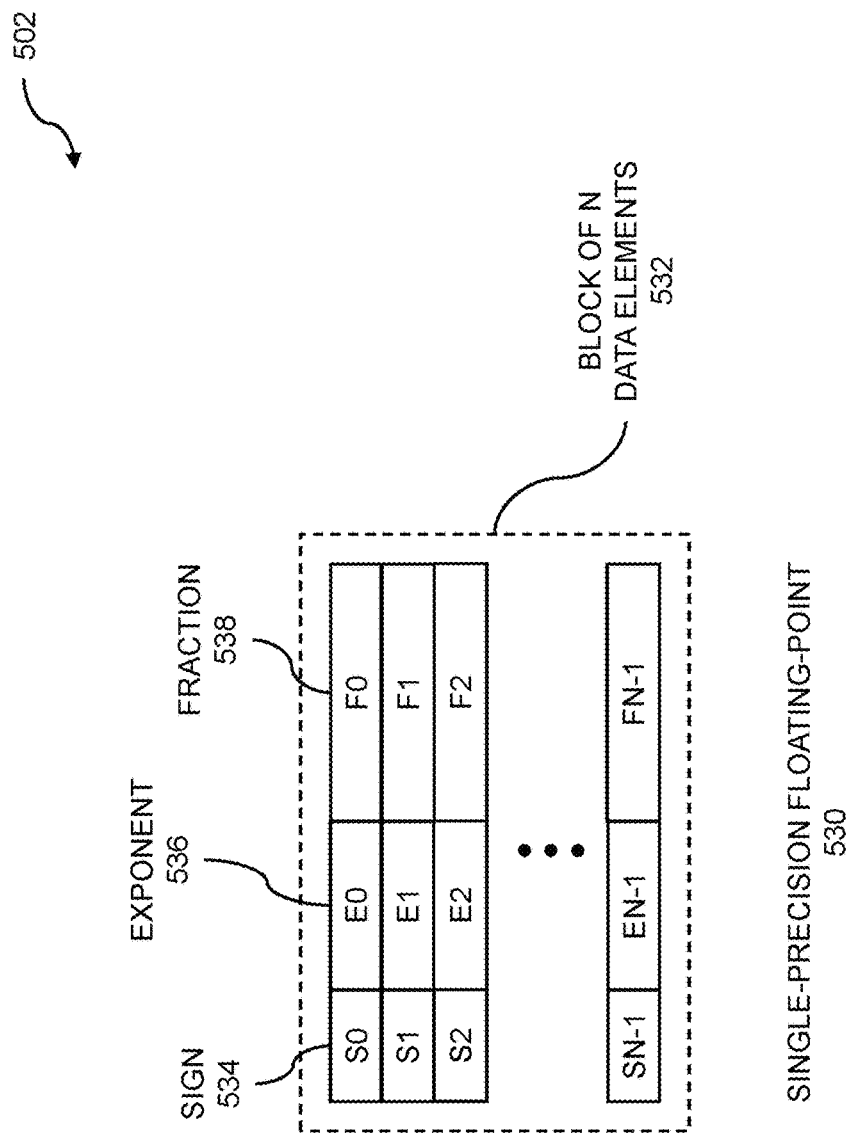
FIG. 5B shows single-precision floating-point representation.

FIG. 5B shows a single-precision floating-point representation. Stated above, a processor can perform data computations based on mixed-precision data. The computations can be performed within one or more layers of a neural network. The neural network can include a deep neural network (DNN), a convolutional neural network (CNN), a recurrent neural network (RNN), or other neural network appropriate to data manipulation. The neural network processing uses mixed-precision data representation. A first left group of data and a first right group of data are obtained for computation using a processor. A second left group of data and a second right group of data are obtained. A sum of products is performed between the first left and right groups and the second left and right groups. The sum of products is performed on bytes of 8-bit integer data. The first result and the second result are output as four-byte results.

Data element blocks that can include single-precision floating-point representation are shown 502. Other precisions such as reduced-precision or a double-precision representations can be used. Values in floating-point representation 530 can be included in a data element block 532. The data element block can include N values, where the values can be identified or indexed using indices 0 through N−1 or another indexing technique. Each element within the data element block includes a sign 534, an exponent 536, and a fraction 538 (mantissa or significand). The one or more fractions within the data element block can include a number of bits, where the number of bits can support a precision. In embodiments, the one or more fractions of the one or more data elements within the data element block comprise eight bits. An exponent associated with each data element can include a number of bits, where the number of bits can support a range of exponent values. In embodiments, the exponents associated with the one or more data elements within the data element block comprise ten bits. Values in floating-point representation can be converted to other floating-point representations such as a reduced-precision floating-point representation, a double-precision floating-point representation, a block-float representation, and so on.

Figure 6:
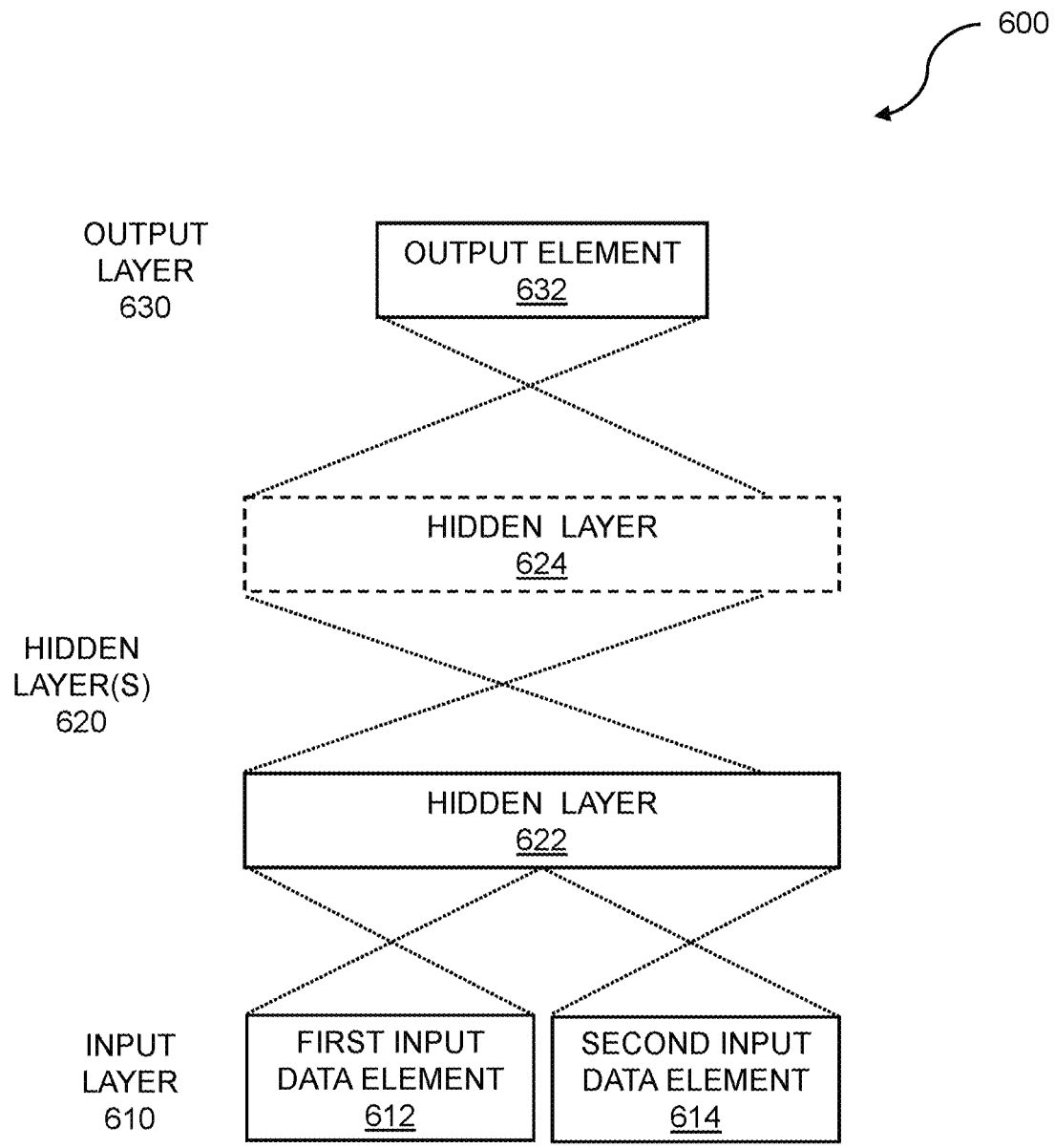
FIG. 6 illustrates an example neural network.

FIG. 6 illustrates an example neural network. A neural network can include a plurality of layers, where a layer within the plurality of layers can perform one of a variety of neural network calculations. The plurality of layers within the neural network can comprise a convolutional neural network, a recurrent neural network, a deep neural network, and so on. The layers can include input layers, output layers, fully connected layers, convolutional layers, pooling layers, rectified linear unit (ReLU) layers, and so on. The results of neural network calculations performed within one layer can be forwarded to a next layer within the neural network. In embodiments, the next layer can be a bottleneck layer of the neural network. The bottleneck layer or the other neural network layers support neural network data computation using mixed-precision. The neural network can apply weights, biases, classifiers, etc., to input data such as image data. A first left group comprising eight bytes of data and a first right group of eight bytes of data are obtained for computation using a processor. A second left group comprising eight bytes of data and a second right group of eight bytes of data are obtained. A sum of products is performed between the first left and right groups and the second left and right groups. The first result and the second result are output as four-byte results, based on the performing.

Layers including one or more hidden layers for a neural network are shown 600. The neural network layers, such as the one or more hidden layers, a bottleneck layer, and so on, can be used for a variety of applications for data manipulation. The data manipulation can include data manipulation for image processing, audio processing, or other processing applications. The deep neural network can include a plurality of layers. The plurality of layers can include an input feature layer 610. The input layer can receive data presented to the layer for manipulation, where the data can include a first data element 612, a second data element 614, and so on. While two data elements are shown, other numbers of data elements can be presented to the input layer for processing. A variety of numbering formats can be used to represent the first data element, the second data element, and so on. The numbering formats can include integer formats (signed, unsigned), reduced floating point, single-precision floating point, double-precision floating point, and so on. In embodiments, the first input data element includes a 16-bit reduced floating-point representation. The second input data element can also include one or more numbering formats. In embodiments, the second input data element can be an 8-bit integer representation element. The 8-bit integer representation can include an unsigned integer representation, where the unsigned integer representation can be used to represent red-green-blue (RGB) image data.

The neural network can include one or more hidden layers 620. As discussed throughout, the one or more hidden layers can include fully connected layers, convolutional layers, pooling layers, rectified linear unit (ReLU) layers, and so on. The example neural network shows two hidden layers 622 and 624. While two hidden layers are shown, one or more hidden layers can be included in the neural network. In embodiments, one or more hidden layers can include a bottleneck layer. When a hidden layer comprises a bottleneck layer, the bottleneck layer can learn one or more translation vectors. The translation vectors can be used to transform image data or other data. A hidden layer can differ from other layers, such as hidden layers within the neural network, in that the bottleneck layer can include fewer nodes than the one or more preceding hidden layers. The bottleneck layer can act to create a constriction or "bottleneck" within the neural network. The bottleneck layer can constrict the information contained within the data elements being manipulated by the neural network into a low dimensional representation. The low dimensional representation can improve convergence for the data manipulation being performed by the neural network. When the data manipulation includes image processing, features within the image can be extracted. The extraction of features within the image can be accomplished using supervised techniques or unsupervised techniques. The neural network can include one or more output layers 630. The output layer can include an output element 632. The output layer can include a result from manipulating the first data element and the second data element. An output can result from various operations that can be performed by the neural network, including addition, subtraction, multiplication, division, and so on. The operation can include a dot-product operation. In embodiments, the result of the operation can be represented using a single-precision data representation.

Figure 7:
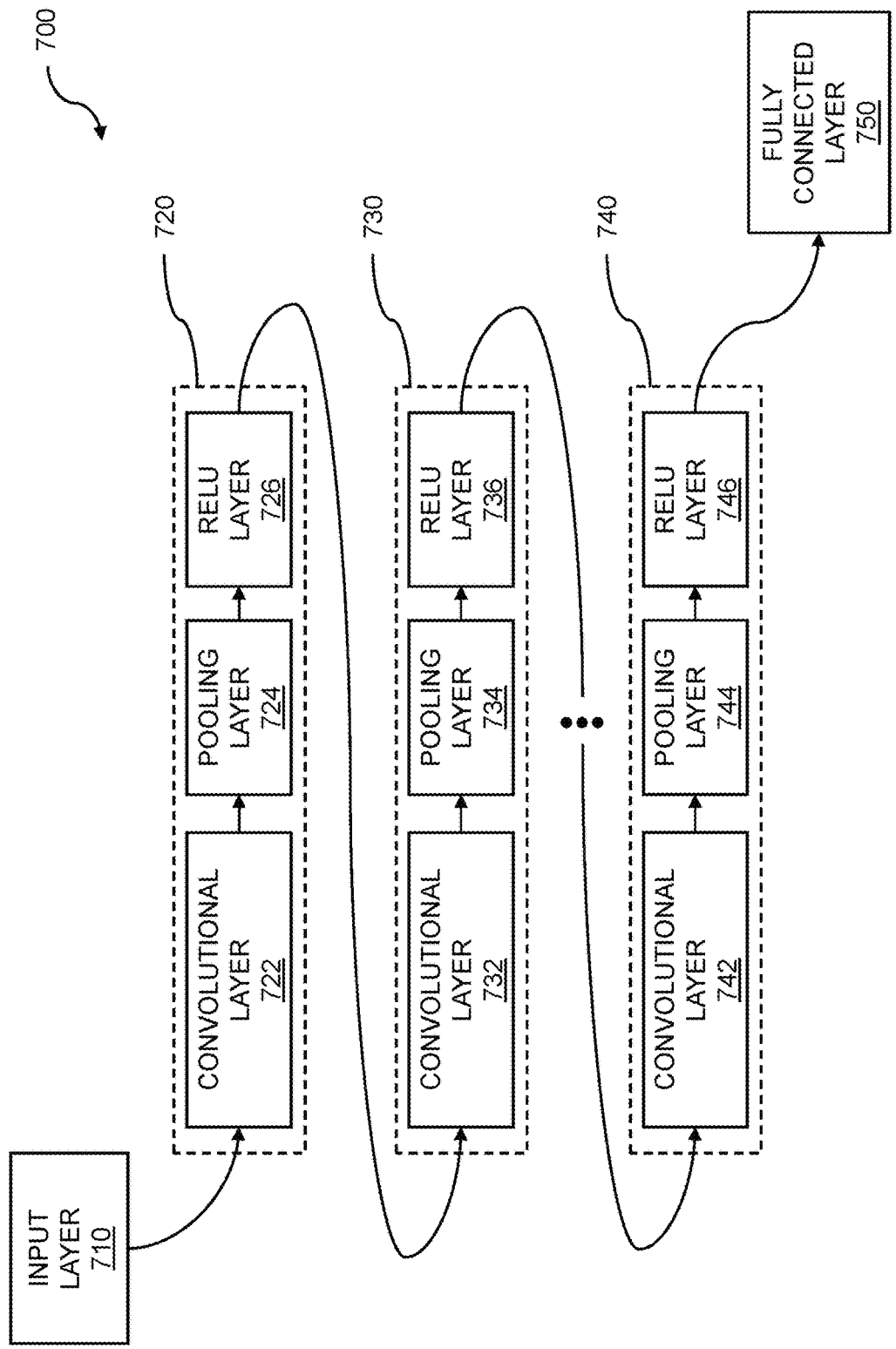
FIG. 7 shows a deep learning block diagram.

FIG. 7 shows a deep learning block diagram. The deep learning block diagram 700 can include a neural network such as a deep neural network (DNN), a convolutional neural network (CNN), a recurrent neural network (RNN), and so on. A convolutional neural network can be based on layers, where the layers can include input layers, output layers, fully connected layers, convolutional layers, pooling layers, rectified linear unit (ReLU) layers, activation layers, bottleneck layers, and so on. The layers of the convolutional network can be implemented using a reconfigurable fabric. The reconfigurable fabric can include processing elements, switching elements, storage elements, etc. The reconfigurable fabric can be used to perform various operations such as logical or other operations, neural network calculations, and the like. Deep learning can be applied to neural network data computation using mixed-precision. The layers of the neural network such as the convolutional neural network can be implemented within one or more integrated circuits or chips, where the chips can include a reconfigurable fabric, an FPGA, an ASIC, and the like. A given chip from among the one or more chips can implement one or more layers of the neural network. When a neural network such as a convolutional neural network cannot be loaded into a reconfigurable fabric, the neural network may be partitioned, where a partition may "fit" into the reconfigurable fabric, FPGA, ASIC, etc.

A deep learning block diagram 700 is shown. The block diagram can include various layers, where the layers can include an input layer, hidden layers, a fully connected layer, and so on. In some embodiments, the deep learning block diagram can include a classification layer. The input layer 710 can receive input data, where the input data can include a first collected data group, a second collected data group, a third collected data group, a fourth collected data group, etc. The collecting of the data groups can be performed in a first locality, a second locality, a third locality, a fourth locality, and so on, respectively. The input layer can then perform processing such as partitioning collected data into non-overlapping partitions. The deep learning block diagram 700, which can represent a network such as a convolutional neural network, can contain a plurality of hidden layers. While three hidden layers, a first hidden layer 720, a second hidden layer 730, and a third hidden layer 740 are shown, other numbers of hidden layers may be present. Each hidden layer can include layers that perform various operations, where the various layers can include a convolutional layer, a pooling layer, and a rectified layer such as a rectified linear unit (ReLU) layer. Thus, a first layer 720 can include a convolutional layer 722, a pooling layer 724, and a ReLU layer 726; a second layer 730 can include a convolutional layer 732, a pooling layer 734, and a ReLU layer 736; and a third layer 740 can include a convolutional layer 742, a pooling layer 744, and a ReLU layer 746. The convolutional layers 722, 732, and 742 can perform convolutional operations; the pooling layers 724, 734, and 744 can perform pooling operations, including max pooling, such as data down-sampling; and the ReLU layers 726, 736, and 746 can perform rectification operations. A convolutional layer can reduce the amount of data feeding into a fully connected layer. The block diagram 700 can include a fully connected layer 750. The fully connected layer can be connected to each data point from the one or more convolutional layers.

Data flow processors can be implemented within a reconfigurable fabric. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs can be configured in arrangements such as quads and can be coupled to arithmetic units, where the arithmetic units can be coupled to or included in data processing units (DPUs). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the cluster enters the configuration mode, various techniques, including direct memory access (DMA) can be used to load instructions from the kernel into instruction memories of the PEs. The clusters that were preprogrammed into configuration mode can be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include both offline and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents.

Autonomous agents can include entities such as groups, organizations, and so on. The actions and interactions of the autonomous agents can be simulated to determine how the agents can influence the operation of an entire system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as machine learning techniques based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

Figure 8:
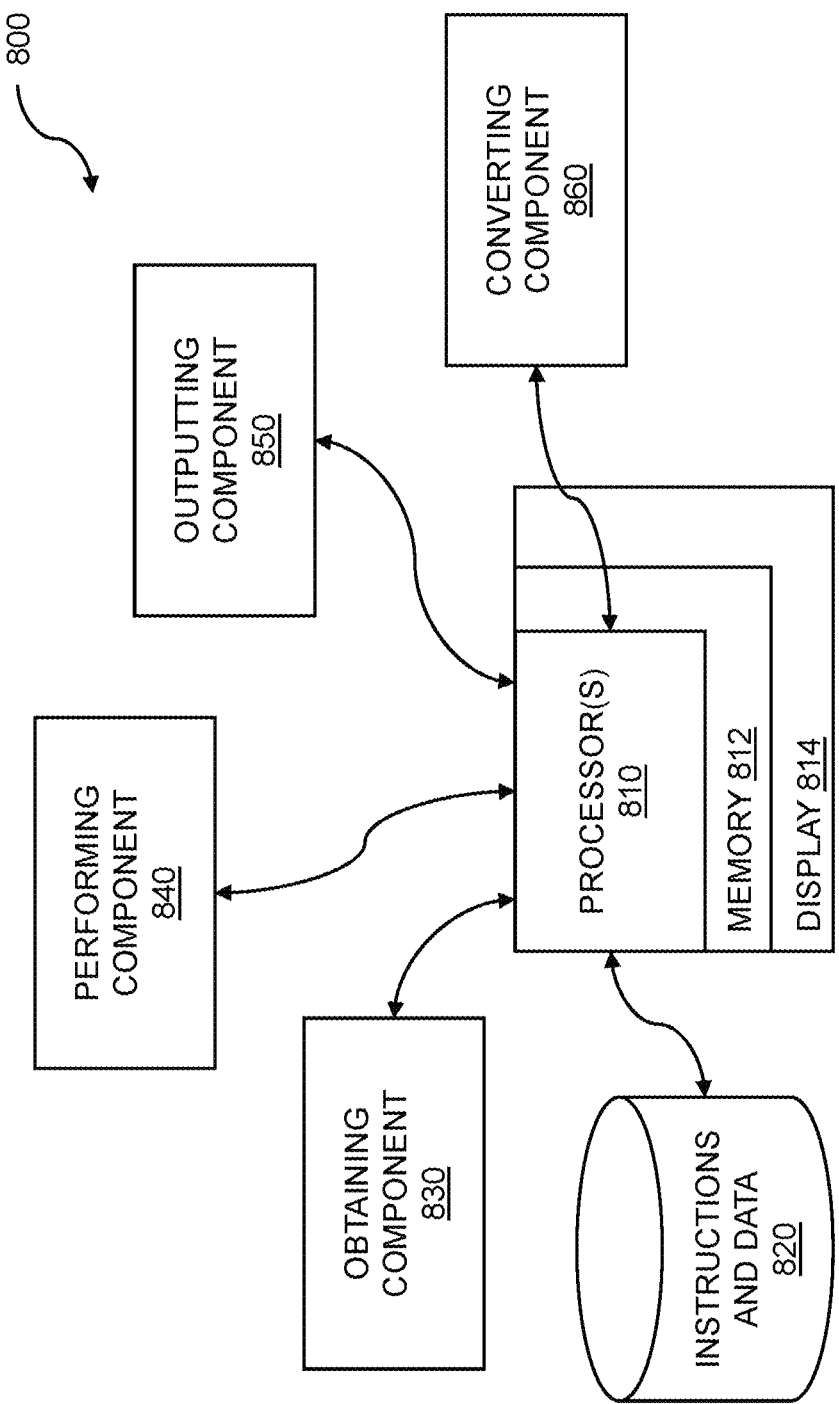
FIG. 8 is a system diagram for data manipulation.

FIG. 8 is a system diagram for data manipulation using representations as described above. The system 800 can include one or more processors 810 coupled to a memory 812 which stores instructions. The system 800 can include a display 814 coupled to the one or more processors 810 for displaying data, data representation elements, neural network data, intermediate steps, instructions, and so on. In embodiments, one or more processors 810 are attached to the memory 812 where the one or more processors, when executing the instructions which are stored, are configured to: obtain a first left group comprising eight bytes of data and a first right group of eight bytes of data for computation using a processor; obtain a second left group comprising eight bytes of data and a second right group of eight bytes of data; perform a sum of products between the first left and right groups and the second left and right groups, wherein the sum of products is performed on bytes of 8-bit integer data, and wherein: a first result is based on a summation of eight values that are products of the first group's left eight bytes and the second group's left eight bytes; and a second result is based on the summation of eight values that are products of the first group's left eight bytes and the second group's right eight bytes; and output the first result and the second result as four-byte results, based on the performing.

The system 800 can include a collection of instructions and data 820. The instructions and data 820 may be stored in a database, one or more statically linked libraries, one or more dynamically linked libraries, precompiled headers, source code, flow graphs, networks, or other suitable formats. The instructions can include instructions for neural network data computation using mixed precision. In embodiments, the processors can include processing elements within a reconfigurable fabric, a parallel processor, a mesh processor, a distributed processor, programmable integrated circuits such as FPGAs or ASICs, and so on. The system 800 can include an obtaining component 830. The obtaining component can include functions and instructions for obtaining a first left group comprising eight bytes of data and a first right group of eight bytes of data for computation using a processor. In embodiments, the processors can include processing elements within a reconfigurable fabric, a parallel processor, a mesh processor, a distributed processor, programmable integrated circuits such as FPGAs or ASICs, and so on. The processor may advantageously support single-precision operations, but it may also be able to support mixed-precision or other operations such as integer operations, 16-bit reduced floating-point operations, 8-bit integer operations, double-precision operations, and so on. In embodiments, the input data can include single instruction multiple data (SIMD) data representations. Single-precision operations can be performed on single-precision data representations. In further embodiments, the obtaining component can include functions and instructions for obtaining a second left group comprising eight bytes of data and a second right group of eight bytes of data.

The system 800 can include a performing component 840. The performing component can include functions and instructions for performing a sum of products between the first left and right groups and the second left and right groups. The performing a sum of products can be performed based on mixed-precision data. In embodiments, the sum of products is performed on bytes of 8-bit integer data. The integer data can include signed or unsigned integer data. The sum of products can also be performed on single-precision or double-precision floating-point data, reduced floating-point data, and the like. In embodiments, a first result is based on a summation of eight values that are products of the first group's left eight bytes and the second group's left eight bytes, and a second result is based on the summation of eight values that are products of the first group's left eight bytes and the second group's right eight bytes. The summation can be computed using processing elements within a reconfigurable fabric. The data for which the sum of products is performed can be obtained from a register or register file, a first in first out (FIFO) memory, a remote FIFO memory, and so on.

The system 800 can include an outputting component 850. The outputting component can include functions and instructions for outputting the first result and the second result as four-byte results, based on the performing. The outputting can include forwarding the first result and the second result to one or more processing elements within the reconfigurable fabric, to processors beyond the reconfigurable fabric, and so on. The outputting can include outputting from a layer within a neural network. The outputting can include storing the results into storage such as DMA storage or remote DMA storage. Further embodiments include outputting a third result and a fourth result, where the third result is based on a summation of eight values that are products of the first group's right eight bytes and the second group's left eight bytes, and the fourth result is based on a summation of eight values that are products of the first group's right eight bytes and the second group's right eight bytes. The system 800 can include a converting component

860. The converting component can include functions and instructions for converting an input for a subsequent sum of products operation to another format. The converting can include converting from an 8-bit integer format to a 16-bit reduced-precision floating-point format, to single-precision or double-precision format, and the like. The converting from an 8-bit integer format can be performed prior to storing results, intermediate results, etc.

The system 800 can include a computer program product embodied in a non-transitory computer readable medium for data manipulation, the computer program product comprising code which causes one or more processors to perform operations of: obtaining a first left group comprising eight bytes of data and a first right group of eight bytes of data for computation using a processor; performing a sum of products between the first left and right groups and the second left and right groups, wherein the sum of products is performed on bytes of 8-bit integer data, and wherein: a first result is based on a summation of eight values that are products of the first group's left eight bytes and the second group's left eight bytes; and a second result is based on the summation of eight values that are products of the first group's left eight bytes and the second group's right eight bytes; and outputting the first result and the second result as four-byte results, based on the performing.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps or groups of steps of the methods, apparatus, systems, computer program products, and/or computer-implemented methods. Any and all such functions-generally referred to herein as a "circuit," "module," or "system" may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for data manipulation comprising:
    obtaining, from input data associated with a neural network, a first left group comprising eight bytes of data from a first row of a first matrix and a first right group of eight bytes of data from a second row of the first matrix for computation using a processor;
    obtaining, from the input data, a second left group comprising eight bytes of data from a first column of a second matrix and a second right group of eight bytes of data from a second column of the second matrix;
    performing a sum of products between the first left and right groups and the second left and right groups, wherein the sum of products is performed on bytes of 8-bit integer data, and wherein:
        a first result is based on a summation of eight values that are products of the first group's left eight bytes and the second group's left eight bytes; and
        a second result is based on the summation of eight values that are products of the first group's left eight bytes and the second group's right eight bytes;
    outputting the first result and the second result as four-byte results for neural network data processing, based on the performing;
    adding the first result to a value in a first accumulation register and adding the second result to a value in a second accumulation register;
    determining whether the input data comprises greater than 32 bytes of input data; and
    in response to a determination that the input data comprises greater than 32 bytes of input data then iterating the obtaining, performing, output, and adding steps.

2. The method of claim 1, wherein the input data comprises training data for training the neural network.

3. The method of claim 1, wherein the neural network comprises a trained neural network, and the input data comprises inference data to be evaluated by the neural network.

4. The method of claim 1, wherein the neural network comprises a plurality of layers, and the input data comprises a set of weights defining at least one of the plurality of layers of the neural networks.

5. The method of claim 3, wherein the plurality of layers comprise a plurality of hidden layers.

6. The method of claim 1, wherein the neural network data processing comprises machine learning.

7. The method of claim 1, wherein the neural network data processing comprises image processing.

8. The method of claim 1, wherein the neural network data processing comprises machine vision.

9. The method of claim 1, wherein the processor comprises a processor of a client device.

10. The method of claim 1, wherein the processor comprises a processor of a server device.

11. The method of claim 1, wherein the processor comprises a processor of a cloud-based computing device.

12. A computer program product embodied in a non-transitory computer readable medium for data manipulation, the computer program product comprising code which causes one or more processors to perform operations of:
    obtaining, from input data associated with a neural network, a first left group comprising eight bytes of data from a first row of a first matrix and a first right group of eight bytes of data from a second row of the first matrix for computation using a processor;
    obtaining, from the input data, a second left group comprising eight bytes of data from a first column of a second matrix and a second right group of eight bytes of data from a second column of the second matrix;
    performing a sum of products between the first left and right groups and the second left and right groups, wherein the sum of products is performed on bytes of 8-bit integer data, and wherein:
        a first result is based on a summation of eight values that are products of the first group's left eight bytes and the second group's left eight bytes; and
        a second result is based on the summation of eight values that are products of the first group's left eight bytes and the second group's right eight bytes;
    outputting the first result and the second result as four-byte results for neural network data processing, based on the performing;
    adding the first result to a value in a first accumulation register and adding the second result to a value in a second accumulation register;
    determining whether the input data comprises greater than 32 bytes of input data; and
    in response to a determination that the input data comprises greater than 32 bytes of input data then iterating the obtaining, performing, output, and adding steps.

13. The computer readable medium of claim 12, wherein the input data comprises training data for training the neural network.

14. The computer readable medium of claim 12, wherein the neural network comprises a trained neural network, and the input data comprises inference data to be evaluated by the neural network.

15. The computer readable medium of claim 12, wherein the neural network comprises a plurality of layers, and the input data comprises a set of weights defining at least one of the plurality of layers of the neural networks.

16. The computer readable medium of claim 12, wherein the neural network data processing comprises machine learning.

17. The computer readable medium of claim 12, wherein the neural network data processing comprises image processing.

18. The computer readable medium of claim 12, wherein the neural network data processing comprises machine vision.

19. A computer system for data manipulation comprising:
    a memory which stores instructions;
    one or more processors coupled to the memory wherein the one or more processors, when executing the instructions which are stored, are configured to:
        obtain, from input data associated with a neural network, a first left group comprising eight bytes of data from a first row of a first matrix and a first right group of eight bytes of data from a second row of the first matrix for computation using a processor;

obtain, from the input data, a second left group comprising eight bytes of data from a first column of a second matrix and a second right group of eight bytes of data from a second column of the second matrix;

perform a sum of products between the first left and right groups and the second left and right groups, wherein the sum of products is performed on bytes of 8-bit integer data, and wherein:

a first result is based on a summation of eight values that are products of the first group's left eight bytes and the second group's left eight bytes; and a second result is based on the summation of eight values that are products of the first group's left eight bytes and the second group's right eight bytes;

output the first result and the second result as four-byte results for neural network data processing, based on the performing;

add the first result to a value in a first accumulation register and adding the second result to a value in a second accumulation register;

determine whether the input data comprises greater than 32 bytes of input data; and in response to a determination that the input data comprises greater than 32 bytes of input data then iterate the obtaining, performing, output, and adding steps.

* * * * *